United States Patent
Wang et al.

(10) Patent No.: US 12,190,442 B1
(45) Date of Patent: Jan. 7, 2025

(54) SAND DUNE EXTRACTION METHOD BASED ON FUSION OF POSITIVE-NEGATIVE TERRAINS AND LIGHT SHADING

(71) Applicant: Nanjing University of Information Science & Technology, Nanjing (CN)

(72) Inventors: Guojie Wang, Nanjing (CN); Wen Dai, Nanjing (CN); Bo Wang, Nanjing (CN); Jiaxing Fan, Nanjing (CN); Ruibo Qiu, Nanjing (CN); Xiaodong Zheng, Nanjing (CN)

(73) Assignee: Nanjing University of Information Science & Technology, Nanjing (CN)

( * ) Notice: Subject to any disclaimer, the term of this patent is extended or adjusted under 35 U.S.C. 154(b) by 0 days.

(21) Appl. No.: 18/762,672

(22) Filed: Jul. 3, 2024

(30) Foreign Application Priority Data

Jan. 15, 2024  (CN) .......................... 202410052019.4

(51) Int. Cl.
  *G06T 15/80* (2011.01)
  *G06T 17/05* (2011.01)
(52) U.S. Cl.
  CPC .............. *G06T 15/80* (2013.01); *G06T 17/05* (2013.01)
(58) Field of Classification Search
  CPC .................................. G06T 15/80; G06T 17/05
  See application file for complete search history.

(56) References Cited

U.S. PATENT DOCUMENTS

2022/0051475 A1* 2/2022 Bingham ................ G06T 17/05

FOREIGN PATENT DOCUMENTS

CN            114494319 A  *  5/2022  ........... G06F 18/214

OTHER PUBLICATIONS

Levin, N., E. Ben-Dor, and A. Karnieli. "Topographic information of sand dunes as extracted from shading effects using Landsat images." Remote Sensing of Environment 90.2 (2004): 190-209. (Year: 2004).*
Peng, Jianwei, Yi Zhang, and Jie Shan. "Shading-based DEM refinement under a comprehensive imaging model." ISPRS Journal of Photogrammetry and Remote Sensing 110 (2015): 24-33. (Year: 2015).*

* cited by examiner

*Primary Examiner* — Daniel F Hajnik

(57) ABSTRACT

A sand dune extraction method based on fusion of positive-negative terrains and light shading includes: obtaining an original digital elevation model of a study region; using a neighborhood analysis method to process the original digital elevation model of the study region, thereby extracting a positive terrain region and a negative terrain region of the study region; using a lighting shading method to perform six directional lighting simulation calculations on each pixel of the original digital elevation model of the study region to obtain a lighting shading map, and extracting a lighting region and a shadow region of the study region from the lighting shading map; using an embedding method to fuse the positive terrain region and the negative terrain region with the lighting region and the shadow region. The sand dune extraction method is a method for remote sensing monitoring and governance of desertification regions.

7 Claims, 3 Drawing Sheets

SAND DUNE EXTRACTION METHOD BASED ON FUSION OF POSITIVE-NEGATIVE TERRAINS AND LIGHT SHADING

TECHNICAL FIELD

The present disclosure relates to the field of sand dune extraction technology based on digital elevation models (DEMs), and particularly to a sand dune extraction method based on fusion of positive-negative terrains and light shading.

BACKGROUND

Sand dune is the most common type of landform, which is a hilly or ridge-like landform formed by the accumulation of sand grains under the action of wind in desert or sandy land. Under the long-term action of wind, sand dunes will continue to migrate, which will lead to the gradual expansion of desert regions and cause wind erosion and desertification. Desertification has threatened the living region of human beings, and the monitoring and control of desertification has become an important issue today.

The development of unmanned aerial vehicle photogrammetry has improved the efficiency and accuracy of obtaining DEMs. Digital terrain analysis methods based on high-precision DEMs have been rapidly developed and widely applied, especially in regional terrain classification and segmentation, making significant progress. In terms of sand dune extraction, methods of extracting sand dune morphology parameters based on high-resolution remote sensing images has been widely studied in recent years. However, in desert regions, the similarity of ground texture information is extremely high, and it is difficult to accurately extract sand dunes solely based on remote sensing images. High-precision DEM data contains elevation information of geographical features, which can accurately extract sand dunes. For example, extracting terrain parameters such as slope gradient and slope aspect based on DEM data can achieve the extraction of sand dunes, further promoting the research on sand dune morphology analysis. However, using only a single method to extract complex sand dune terrain cannot achieve optimal results. Therefore, there is an urgent need for an accurate, efficient, and automated sand dune extraction method based on fusion of multiple terrain features.

In order to solve the above problems, it is necessary to propose a sand dune extraction method which fuses multiple methods. The sand dune extraction method aims to provide a better effect for regional landform classification and terrain segmentation, extract more accurate sand dune morphology, and facilitate the exploration of sand dune evolution laws.

SUMMARY

A sand dune extraction method based on fusion of positive-negative terrains (i.e., a positive terrain and a negative terrain) and light shading is provided, which includes:
- step A: obtaining an original digital elevation model of a study region;
- step B: using a neighborhood analysis method to process the original digital elevation model of the study region, thereby extracting a positive terrain region and a negative terrain region of the study region; where the step B includes:
  - step B1: selecting an N*N rectangular neighborhood window (i.e., a rectangular neighborhood window with a pixel size of N*N) to traverse the original digital elevation model of the study region, thereby obtaining a statistical digital elevation model;
  - step B2: using an overlay analysis method to perform a difference operation between the statistical digital elevation model obtained in the step B1 and the original digital elevation model, thereby obtaining a difference digital elevation model;
  - step B3: according to a maximum between-class variance principle and a minimum within-class variance principle, performing image binarization classification processing on the difference digital elevation model, thereby dividing the difference digital elevation model into the positive terrain region and the negative terrain region; and
  - step B4: processing the positive terrain region and the negative terrain region in the step B3 by removing null values, thereby obtaining a sand dune extraction result based on the positive-negative terrains;
- step C: using a lighting shading method to perform six directional lighting simulation calculations on each pixel of the original digital elevation model of the study region to obtain a lighting shading map, and extracting a lighting region and a shadow region of the study region from the lighting shading map as a sand dune extraction result based on the light shading; where the step C includes:
  - step C1: determining light source positions of each pixel of the original digital elevation model in six directions based on an elevation angle and an azimuth angle of a simulation light source;
  - step C2: calculating a reflection direction of each pixel of the original digital elevation model under simulated illumination (i.e., the original digital elevation model is illuminated by the simulation light source) according to the light source positions determined in the step C1;
  - step C3: calculating a reflection intensity of each pixel of the original digital elevation model under the simulated illumination based on the reflection direction determined in the step C2, thereby obtaining the lighting shading map of the original digital elevation model; and
  - step C4: according to the maximum between-class variance principle and the minimum within-class variance principle, performing image binarization classification processing on the lighting shading map, thereby dividing the lighting shading map into the lighting region and the shadow region as the sand dune extraction result based on the light shading; and
- step D: using an embedding method (i.e., a data management method called "Mosaic To New Raster") to fuse the sand dune extraction result based on the positive-negative terrains of the step B with the sand dune extraction result based on the light shading of step C; where the embedding method is performed based on a maximum value rule, and the maximum value rule comprises: in an overlapped region of two grids, taking a value of a grid of the two grids with a largest pixel value as a value of an embedded grid, and removing null values to obtain a fused sand dune extraction result.

In an embodiment, a resolution of the original digital elevation model is 0.5 meters.

In an embodiment, the sand dune extraction method further includes: obtaining a digital orthophoto model of the study region with a resolution of 0.5 meters for manually assisted visual judgment.

In an embodiment, the step B1 includes:

for the study region, selecting a rectangular neighborhood window with a pixel size of 3*3 to traverse all pixels of the original digital elevation model row by row, calculating an average value of pixels in the rectangular neighborhood window and assigning the average pixel value to a central pixel in the rectangular neighborhood window, thereby generating the statistical digital elevation model of the study region;

where a formula for calculating the average value of the central pixel in the rectangular neighborhood window is expressed as:

$$\gamma(i, j) = \sum_{m=1}^{3} \sum_{n=1}^{3} \varphi(m, n) t(m, n);$$

where $\gamma(i, j)$ represents a value of a central pixel (i, j) in the rectangular neighborhood window, i represents a coordinate value of the central pixel in the rectangular neighborhood window on an x-axis, and j represents a coordinate value of the central pixel in the rectangular neighborhood window on a y-axis; $\varphi(m, n)$ represents a calculation window, $t(m, n)$ represents a statistical type window, $$t(m, n) = \begin{pmatrix} \frac{1}{9} & \frac{1}{9} & \frac{1}{9} \\ \frac{1}{9} & \frac{1}{9} & \frac{1}{9} \\ \frac{1}{9} & \frac{1}{9} & \frac{1}{9} \end{pmatrix},$$

m represent a row number of the rectangular neighborhood window and m=1, 2, 3, and n represents a column number of the rectangular neighborhood window and n=1, 2, 3.

In an embodiment, in the step C1, the six directional lighting simulation calculations are determined by an azimuth interval of 60 degrees.

In an embodiment, in the step C1, formulas for calculating the elevation angle are expressed as:

$$\sin h = \sin \varphi \sin \delta + \cos \varphi \cos \delta \cos t;$$

$$t = \frac{T}{360};$$

where h represents a solar elevation angle, $\varphi$ represents a geographical latitude, and $\delta$ represents a solar declination angle; both $\varphi$ and $\delta$ are positive at north latitude and negative at south latitude; t represents a hour angle; and T represents shooting time.

In an embodiment, in the step C3, the lighting shading method is used to calculate the lighting shading map based on an azimuth interval of 60 degrees, and a calculation formula for the lighting shading map is expressed as:

$$E = E_0 \times (\cos(\theta_Z) \times \cos(\emptyset_S) + \sin(\theta_Z) \times \sin(\emptyset_S) \times \cos(\theta_A - \emptyset_A));$$

E represents a shadow simulation value with a value range of 0 to 255; $E_0$ represents an illumination maximum radiation intensity; $\theta_Z$ represents the elevation angle of the simulation light source; $\theta_A$ represents the azimuth angle of the simulation light source; $\emptyset_A$ represents a ground slope aspect; and $\emptyset_S$ represents a ground slope gradient.

In an embodiment, the sand dune extraction method further includes: applying the fused sand dune extraction result in remote sensing monitoring and governance of the study region.

In an embodiment, the sand dune extraction method further includes: determining an evolution law of sand dunes of the study region based on the fused sand dune extraction result, and thereby applying the evolution law of sand dunes in planning of roads and buildings in the study region to construct the roads and the buildings in the study region, so as to reduce erosion and influence of sandstorm on the roads and the buildings.

The sand dune extraction method of the present disclosure combines positive terrains, negative terrains and the light shading method to obtain more accurate sand dune extraction results. Tests have shown that the accuracy of the sand dune extraction results of the present invention is as high as 87%, and the extraction process is automated and has high accuracy and practicality. The present disclosure effectively solves the problem of inaccuracy and low efficiency caused by relying on a single terrain feature to extract sand dunes in the related art. The present disclosure provides a new method for regional landform classification and terrain segmentation, and provides a better method for remote sensing monitoring and governance of desertification regions.

DETAILED DESCRIPTION OF EMBODIMENTS

The following embodiments are intended to provide those skilled in the art with a more complete understanding of the present disclosure and are not intended to limit the present disclosure.

Embodiment 1

Figure 1:
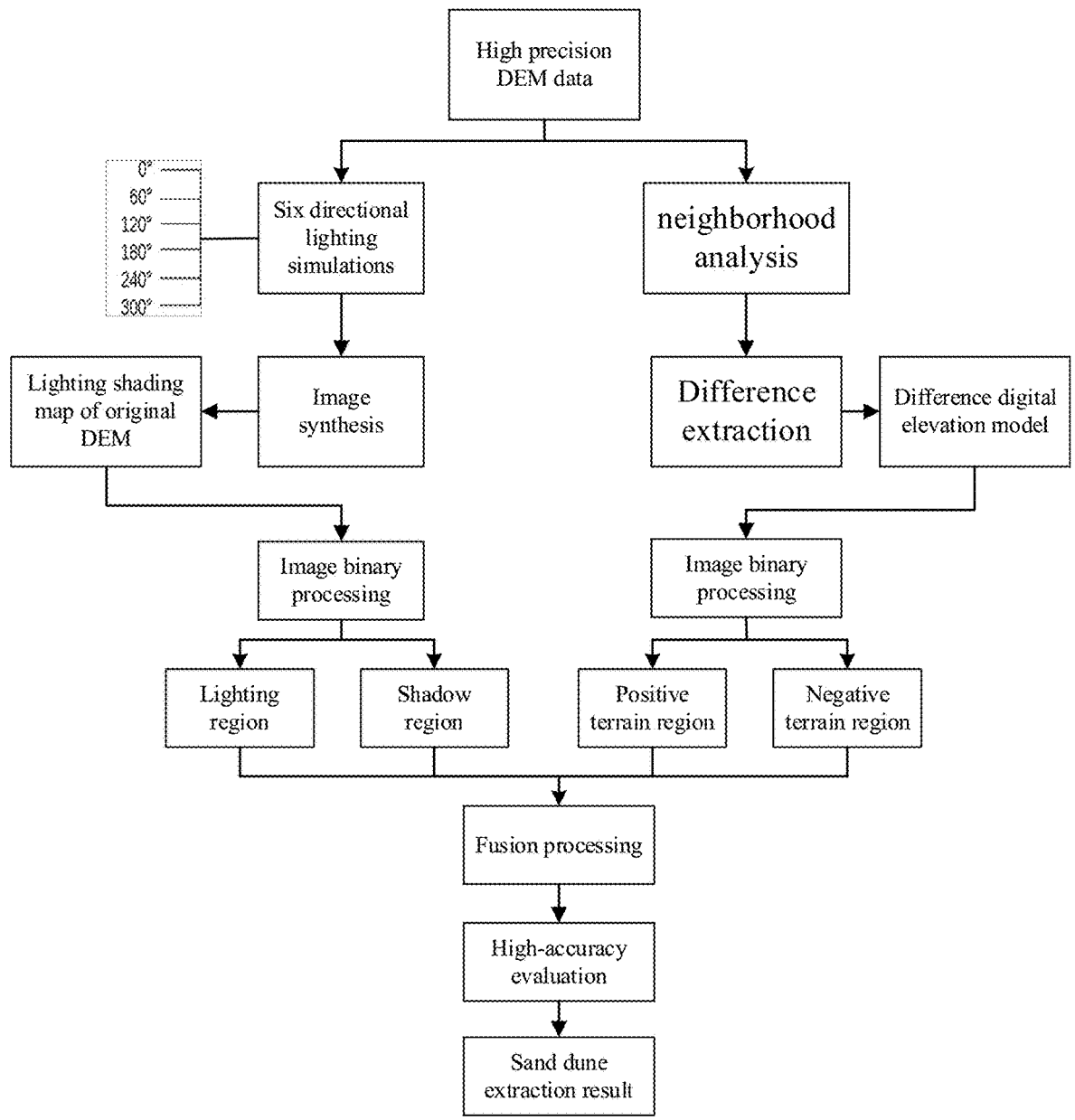
FIG. 1 illustrates a flowchart of a sand dune extraction method based on fusion of positive-negative terrains and light shading in an embodiment of the present disclosure.

Referring to FIG. 1, a sand dune extraction method based on fusion of positive-negative terrains and light shading includes the following steps A-D.

In the step A, an original digital elevation model of a study region with a high resolution (such as a resolution of 0.5 meters) is obtained. In an illustrated embodiment, a digital orthophoto model of the study region with a resolution of 0.5 meters is obtained for manually assisted visual judgment.

In the step B, a neighborhood analysis method is used to process the original digital elevation model of the study region, thereby extracting a positive terrain region and a negative terrain region of the study region. Specifically, the step B includes step B1, step B2, step B3, and step B4.

In the step B1, n N*N rectangular neighborhood window is selected to traverse the original digital elevation model of the study region, thereby obtaining a statistical digital elevation model. Specifically, for the study region, the original digital elevation model has a resolution of 0.5 meters, and a rectangular neighborhood window with a pixel size of 3*3 (i.e., the rectangular neighborhood window has 9 pixels) in the original digital elevation model is selected. The rectangular neighborhood window is used to calculate an average value of pixels in the rectangular neighborhood window in the original digital elevation model of the study region, and the average value is assigned to a central pixel (i.e., a pixel located in the center of the rectangular neighborhood window) in the rectangular neighborhood window, thereby generating the statistical digital elevation model of the study region based on each central pixel.

A formula for calculating the average value of the central pixel in the rectangular neighborhood window is expressed as:

$$\gamma(i, j) = \sum_{m=1}^{3} \sum_{n=1}^{3} \varphi(m, n) t(m, n);$$

where $\gamma(i, j)$ represents a value of a central pixel $(i, j)$ in the rectangular neighborhood window, i represents a coordinate value of the central pixel in the rectangular neighborhood window on an x-axis, and j represents a coordinate value of the central pixel in the rectangular neighborhood window on a y-axis; $\varphi(m, n)$ represents a calculation window, $t(m, n)$ represents a statistical type window, $$t(m, n) = \begin{pmatrix} \frac{1}{9} & \frac{1}{9} & \frac{1}{9} \\ \frac{1}{9} & \frac{1}{9} & \frac{1}{9} \\ \frac{1}{9} & \frac{1}{9} & \frac{1}{9} \end{pmatrix},$$

m represents a row of the rectangular neighborhood window m=1, 2, 3, and n represents a column of the rectangular neighborhood window and n=1, 2, 3.

In the step B2, an overlay analysis method is used to perform a difference operation between the statistical digital elevation model obtained in the step B1 and the original digital elevation model, thereby obtaining a difference digital elevation model.

In the step B3, according to a maximum between-class variance principle and a minimum within-class variance principle, image binarization classification processing is performed on the difference digital elevation model, thereby dividing the difference digital elevation model into two classes. Specifically, the class with larger average pixel values are defined as the positive terrain region, and the class with smaller average pixel values are defined as the negative terrain region.

In the step B4, the positive terrain region and the negative terrain region in the step B3 are processed by removing null values, thereby obtaining a sand dune extraction result based on the positive-negative terrains. In some embodiments, the step B4 can be omitted.

In the step C, a lighting shading method is used to perform six directional lighting simulation calculations on each pixel of the original digital elevation model of the study region to obtain a lighting shading map, and a lighting region and a shadow region of the study region are extracted from the lighting shading map as a sand dune extraction result based on the lighting shading. The step C includes the following step C1, step C2, step C3, and step C4.

In the step C1, light source positions of each pixel of the original digital elevation model in six directions are determined based on an elevation angle and an azimuth angle of a simulation light source. In an illustrated embodiment, in the step C1, the six directional lighting simulation calculations are determined by an azimuth interval of 60 degrees.

In the step C2, a reflection direction of each pixel of the original digital elevation model is calculated under simulated illumination according to the light source positions determined in the step C1.

In the step C3, a reflection intensity of each pixel of the original digital elevation model is calculated under the simulated illumination based on the reflection direction determined in the step C2, thereby obtaining the lighting shading map of the original digital elevation model.

In the step C4, according to the maximum between-class variance principle and the minimum within-class variance principle, image binarization classification processing is performed on the lighting shading map, thereby dividing the lighting shading map into the lighting region and the shadow region as the sand dune extraction result based on the light shading.

In the embodiment, the lighting shading method is used to calculate the lighting shading map based on an azimuth interval of 60 degrees, and a calculation formula for the lighting shading map is expressed as:

$$E = E_0 \times (\cos(\theta_Z) \times \cos(\emptyset_S) + \sin(\theta_Z) \times \sin(\emptyset_S) \times \cos(\theta_A - \emptyset_A));$$

where E represents a shadow simulation value with a value range of 0 to 255; $E_0$ represents an illumination maximum radiation intensity; $\theta_Z$ represents the elevation angle of the simulation light source; $\theta_A$ represents the azimuth angle of the simulation light source; $\emptyset_A$ represents a ground slope aspect; and $\emptyset_S$ represents a ground slope gradient.

In the step D, an embedding method is used to fuse the sand dune extraction result based on the positive-negative terrains of the step B with the sand dune extraction result based on the light shading of step C. The embedding method is performed based on a maximum value rule, and the maximum value rule is as follows: in an overlapped region of two grids, a value of a grid of the two grids with a largest pixel value is taken as a value of an embedded grid, and null values are removed to obtain a fused sand dune extraction result.

The sand dune extraction method of the present disclosure is a better method for remote sensing monitoring and control of desertification regions.

Embodiment 2

Figure 2:
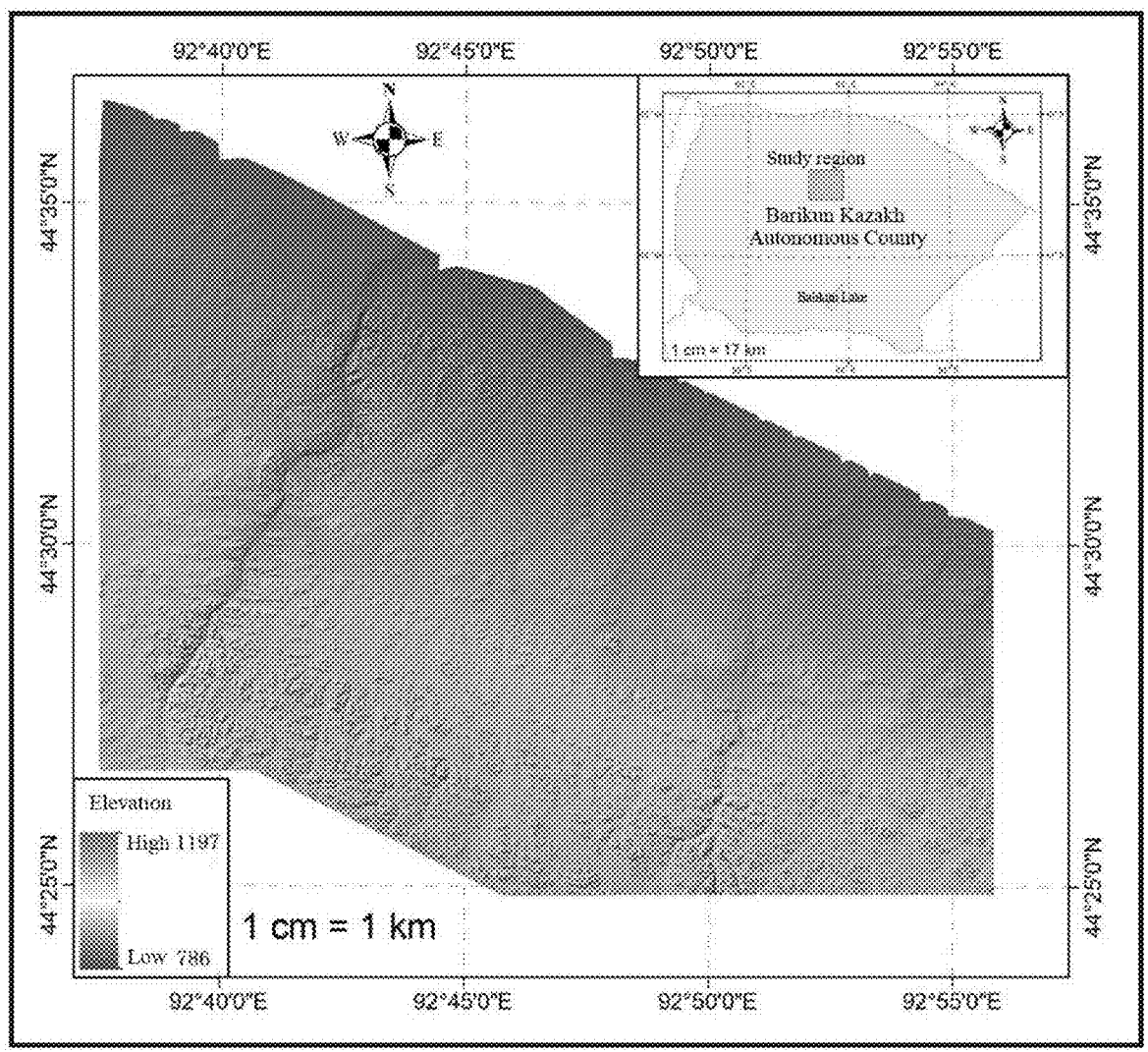
FIG. 2 illustrates a schematic diagram of high-precision digital elevation model data for a study region generated from point cloud data.

FIG. 2 illustrates a schematic diagram of high-precision digital elevation model data for a study region generated from point cloud data. The following steps are used to process the point cloud data.

In the step 1, an original digital elevation model of a study region with a resolution of 0.5 meters is obtained. Meanwhile, a digital orthophoto model of the study region with a resolution of 0.5 meters is obtained. In the embodiment, a tool for generating the digital elevation model is a tool named "Rasterize" in Cloud Compare® software, a sampling step size is 0.5 meter, and a final result is shown in FIG. 2.

In the step 2, for the study region in the step 1, a rectangular neighborhood window with a size of 3*3 pixels is selected from the original digital elevation model with the resolution of 0.5 meters, an average value of pixels in the 3*3 pixel neighborhood (i.e., the rectangular neighborhood window) is calculated row by row and each average value is assigned to a corresponding central pixel in the rectangular neighborhood window, thereby obtaining a statistical digital elevation model of the study region.

In the step 3, an overlay analysis method is used to perform a difference operation between the statistical digital elevation model obtained in the step 2 and the original digital elevation model, thereby obtaining a difference digital elevation model. In the embodiment, a tool for performing the difference operation is a "Raster Calculator" tool in the ArcGIS® software.

In the step 4, according to a maximum between-class variance principle and a minimum within-class variance principle, the difference digital elevation model is divided into two types of regions, i.e., a positive terrain region and a negative terrain region. Specifically, the positive terrain region represents sand dunes.

Figure 3:
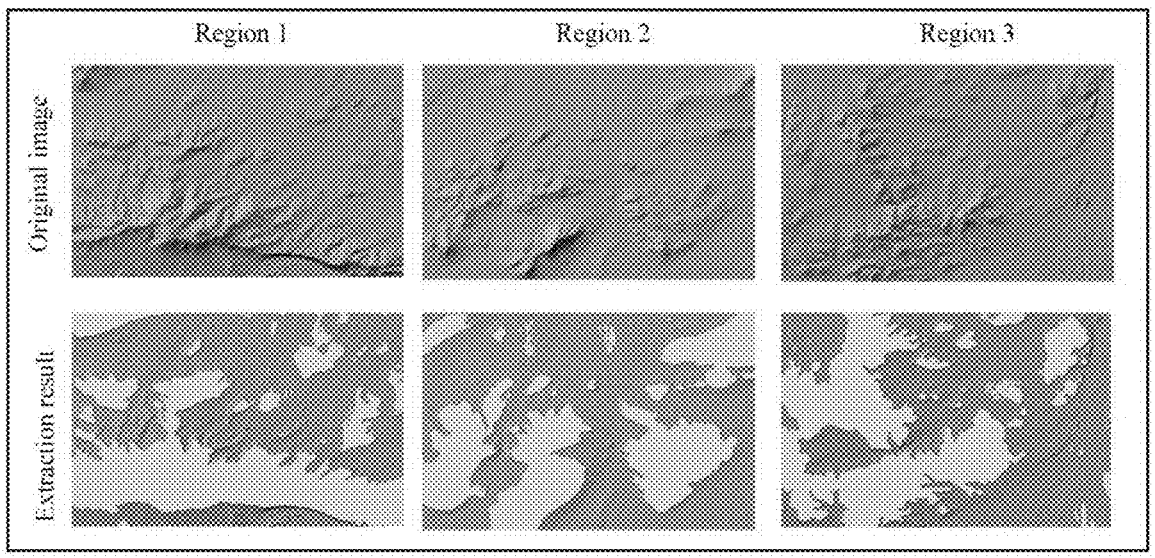
FIG. 3 illustrates a schematic diagram of sand dune extraction results of three study regions based on positive-negative terrains.

In the step 5, the positive terrain region and the negative terrain region obtained in the step 4 are obtained by removing null values, thereby obtaining a sand dune extraction result based on the positive terrain region and the negative terrain region. FIG. 3 illustrates a schematic diagram of sand dune extraction results of three study regions (region 1, region 2, region 3) based on positive-negative terrains.

In the step 6, for the original digital elevation model obtained in the step 1, a lighting shading method is used to perform six directional lighting simulation calculations on each pixel of the original digital elevation model of the study region to obtain a lighting shading map. In the embodiment, a tool for shading in is a "Hillshade" tool in ArcGIS® software.

Figure 4:
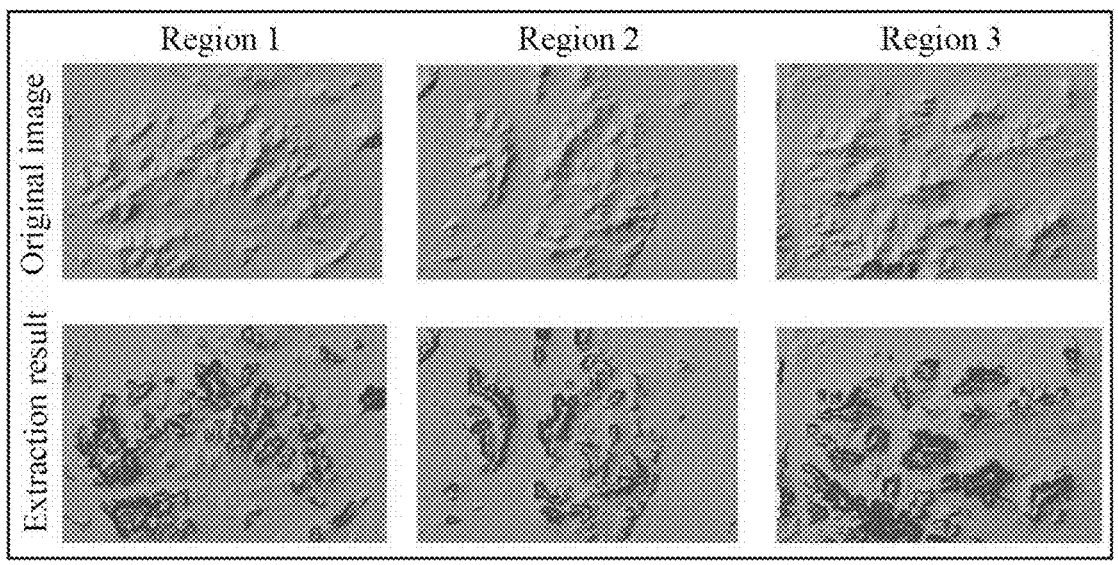
FIG. 4 illustrates a schematic diagram of sand dune extraction results of three study regions based on a lighting shading method.

In the step 7, for the lighting shading map obtained in the step 6, according to a maximum between-class variance principle and a minimum within-class variance principle, the lighting shading map is divided into two types of regions, i.e., a lighting region and a shadow region. Specifically, the lighting region represents a sand dune extraction result of the lighting shading map. FIG. 4 illustrates a schematic diagram of sand dune extraction results of three study regions (the three study regions are selected from FIG. 2) based on a lighting shading method.

Figure 5:
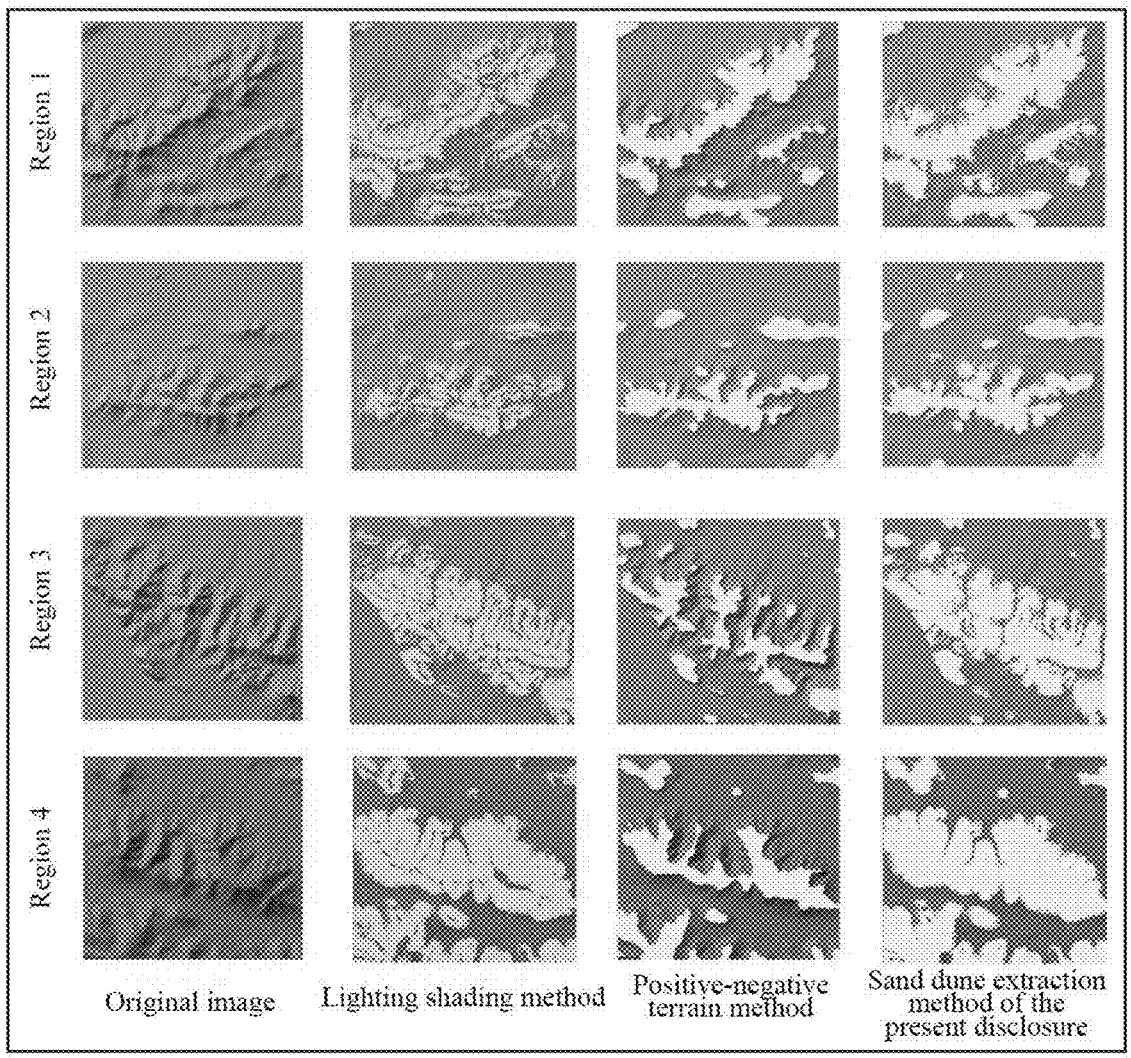
FIG. 5 illustrates a comparison diagram of sand dune extraction results of three study regions based on positive-negative terrains, the lighting shading method, the sand dune extraction method of the present disclosure.

In the step 8, the positive-negative terrain results obtained in the step 5 and the with sand dune extraction results based on the lighting shading method obtained in the step 7 are fused to obtain fused sand dune extraction results. As shown in FIG. 5, the region 1, the region 2, the region 3, and the region 4 are processed by a lighting shading method, a positive-negative terrain method, and the sand dune extraction method of the present disclosure. Compared with the original images, the sand dune extraction method of the present disclosure obtains accurate sand dune extraction results by combining the lighting shading method and the positive-negative terrain method. The sand dune extraction method of the present disclosure can effectively solve the problems caused by using a single method merely.

In order to objectively and accurately evaluate the accuracy of the sand dune extraction results obtained by the sand dune extraction method of the present disclosure, a confusion matrix method is used to evaluate the accuracy of the method. By converting original grids of the digital elevation model into point data, grids of visual interpretation and field survey are taken as references, and the extraction results of the sand dune extraction method are imported into point features for comparison.

Quantitative evaluation results are shown in TABLE 1. The user accuracy refers to the proportion of correctly extracted positive category samples by the method to the number of samples extracted as positive categories. The user accuracy of the sand dunes of the present invention is 80%. Producer accuracy refers to the proportion of correctly extracted samples as positive categories to the actual number of positive category samples. The producer accuracy of the sand dunes of the present invention is 84%. The overall accuracy refers to the proportion of correctly extracted samples by the model to the total number of samples, and the overall accuracy of the present disclosure is 87%. The results indicate that the sand dune extraction method of present disclosure has high accuracy and practicality.

TABLE 1

Evaluation of the accuracy of sand dune extraction results

| Reference Grid | Extraction results | | |
|---|---|---|---|
| | Open space | Sand dune | Total |
| Open space | 157120151 | 19583883 | 176704034 |
| Sand dune | 14083412 | 76283267 | 90366679 |
| Total | 171203563 | 95867150 | 267070713 |
| User Accuracy | 92% | 80% | — |
| Producer accuracy | 89% | 84% | — |
| Total accuracy | — | — | 87% |

The above are only the preferred embodiments of the present disclosure, and the scope of protection of the present disclosure is not limited to the above embodiments. All technical solutions under the ideas of the present disclosure are within the scope of protection of the present disclosure. It should be pointed out that for those skilled in the art, several improvements and embellishments made without departing from the principles of the present disclosure should be considered as the scope of protection of the present disclosure.

What is claimed is:

1. A sand dune extraction method based on fusion of positive-negative terrains and light shading, comprising:
    step A: obtaining an original digital elevation model of a study region;
    step B: using a neighborhood analysis method to process the original digital elevation model of the study region, thereby extracting a positive terrain region and a negative terrain region of the study region; wherein the step B comprises:
        step B1: selecting an N*N rectangular neighborhood window to traverse the original digital elevation model of the study region, thereby obtaining a statistical digital elevation model;
        step B2: using an overlay analysis method to perform a difference operation between the statistical digital elevation model obtained in the step B1 and the original digital elevation model, thereby obtaining a difference digital elevation model;

step B3: according to a maximum between-class variance principle and a minimum within-class variance principle, performing image binarization classification processing on the difference digital elevation model, thereby dividing the difference digital elevation model into the positive terrain region and the negative terrain region; and step B4: processing the positive terrain region and the negative terrain region in the step B3 by removing null values, thereby obtaining a sand dune extraction result based on the positive-negative terrains;

step C: using a lighting shading method to perform six directional lighting simulation calculations on each pixel of the original digital elevation model of the study region to obtain a lighting shading map, and extracting a lighting region and a shadow region of the study region from the lighting shading map as a sand dune extraction result based on the light shading; where the step C comprises:

step C1: determining light source positions of each pixel of the original digital elevation model in six directions based on an elevation angle and an azimuth angle of a simulation light source;

step C2: calculating a reflection direction of each pixel of the original digital elevation model under simulated illumination according to the light source positions determined in the step C1;

step C3: calculating a reflection intensity of each pixel of the original digital elevation model under the simulated illumination based on the reflection direction determined in the step C2, thereby obtaining the lighting shading map of the original digital elevation model; and step C4: according to the maximum between-class variance principle and the minimum within-class variance principle, performing image binarization classification processing on the lighting shading map, thereby dividing the lighting shading map into the lighting region and the shadow region as the sand dune extraction result based on the light shading; and step D: using an embedding method to fuse the sand dune extraction result based on the positive-negative terrains of the step B with the sand dune extraction result based on the light shading of step C; wherein the embedding method is performed based on a maximum value rule, and the maximum value rule comprises: in an overlapped region of two grids, taking a value of a grid of the two grids with a largest pixel value as a value of an embedded grid, and removing null values to obtain a fused sand dune extraction result.

2. The sand dune extraction method based on fusion of positive-negative terrains and light shading as claimed in claim 1, wherein a resolution of the original digital elevation model is 0.5 meters.

3. The sand dune extraction method based on fusion of positive-negative terrains and light shading as claimed in claim 1, wherein the sand dune extraction method further comprises:

obtaining a digital orthophoto model of the study region with a resolution of 0.5 meters for manually assisted visual judgment.

4. The sand dune extraction method based on fusion of positive-negative terrains and light shading as claimed in claim 1, wherein the step B1 comprises:

for the study region, selecting a rectangular neighborhood window with a pixel size of 3*3 to traverse all pixels of the original digital elevation model row by row, calculating an average value of pixels in the rectangular neighborhood window and assigning the average value to a central pixel in the rectangular neighborhood window, thereby generating the statistical digital elevation model of the study region;

wherein a formula for calculating the average value of the central pixel in the rectangular neighborhood window is expressed as:

$$\gamma(i, j) = \sum_{m=1}^{3} \sum_{n=1}^{3} \varphi(m, n) t(m, n);$$

where $\gamma(i, j)$ represents a value of a central pixel $(i, j)$ in the rectangular neighborhood window, i represents a coordinate value of the central pixel in the rectangular neighborhood window on an x-axis, and j represents a coordinate value of the central pixel in the rectangular neighborhood window on a y-axis; $\varphi(m, n)$ represents a calculation window, $t(m, n)$ represents a statistical type window, $$t(m, n) = \begin{pmatrix} \frac{1}{9} & \frac{1}{9} & \frac{1}{9} \\ \frac{1}{9} & \frac{1}{9} & \frac{1}{9} \\ \frac{1}{9} & \frac{1}{9} & \frac{1}{9} \end{pmatrix},$$

m=1, 2, 3, and n=1, 2, 3.

5. The sand dune extraction method based on fusion of positive-negative terrains and light shading as claimed in claim 1, wherein in the step C1, the six directional lighting simulation calculations are determined by an azimuth interval of 60 degrees.

6. The sand dune extraction method based on fusion of positive-negative terrains and light shading as claimed in claim 1, wherein in the step C1, formulas for calculating the elevation angle are expressed as:

$$\sin h = \sin \varphi \sin \delta + \cos \varphi \cos \delta \cos t;$$

$$t = \frac{T}{360};$$

where h represents a solar elevation angle, $\varphi$ represents a geographical latitude, and $\delta$ represents a solar declination angle; both $\varphi$ and $\delta$ are positive at north latitude and negative at south latitude; t represents a hour angle; and T represents shooting time.

7. The sand dune extraction method based on fusion of positive-negative terrains and light shading as claimed in claim 1, wherein in the step C3, the lighting shading method is used to calculate the lighting shading map based on an azimuth interval of 60 degrees, and a calculation formula for the lighting shading map is expressed as:

$$E = E_0 \times (\cos(\theta_Z) \times \cos(\emptyset_S) + \sin(\theta_Z) \times \sin(\emptyset_S) \times \cos(\theta_A - \emptyset_A));$$

E represents a shadow simulation value with a value range of 0 to 255; $E_0$ represents an illumination maximum radiation intensity; $\theta_Z$ represents the elevation angle of the simulation light source; $\theta_A$ represents the azimuth angle of the simulation light source; $\emptyset_A$ represents a ground slope aspect; and $\emptyset_S$ represents a ground slope gradient.

* * * * *